E. BECKER.
CORN HUSKER.
APPLICATION FILED AUG. 14, 1916. RENEWED MAY 12, 1920.
1,355,645.
Patented Oct. 12, 1920.
4 SHEETS—SHEET 3.
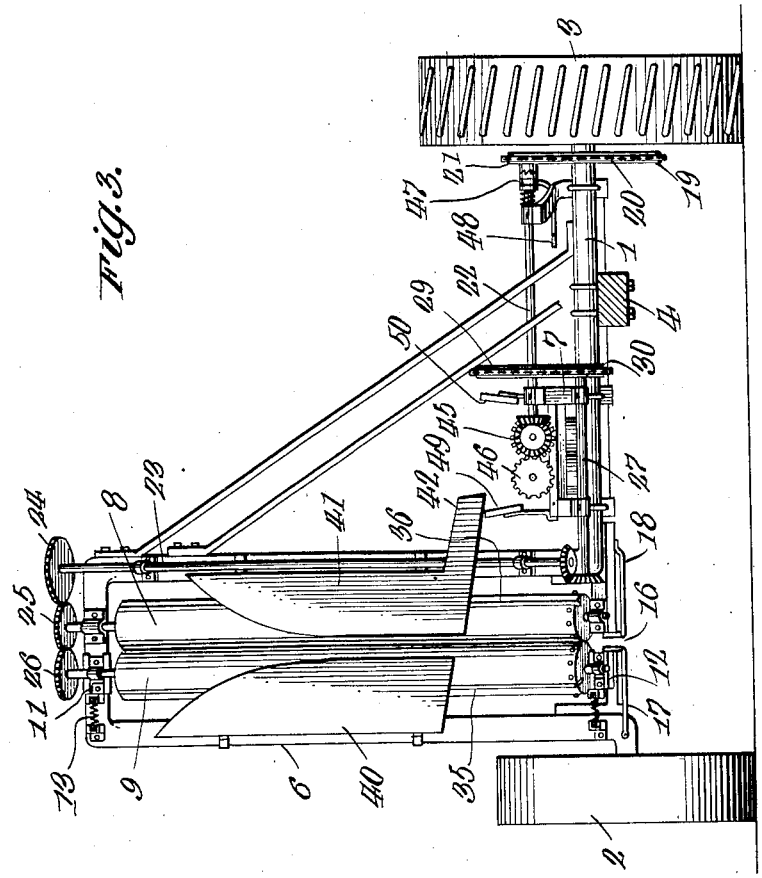
INVENTOR
Earl Becker
WITNESSES
Guy M. Spring
Lloyd W. Patch
BY Richard Owen.
ATTORNEY E. BECKER.
CORN HUSKER.
APPLICATION FILED AUG. 14, 1916. RENEWED MAY 12, 1920.
1,355,645.
Patented Oct. 12, 1920.
4 SHEETS—SHEET 4.
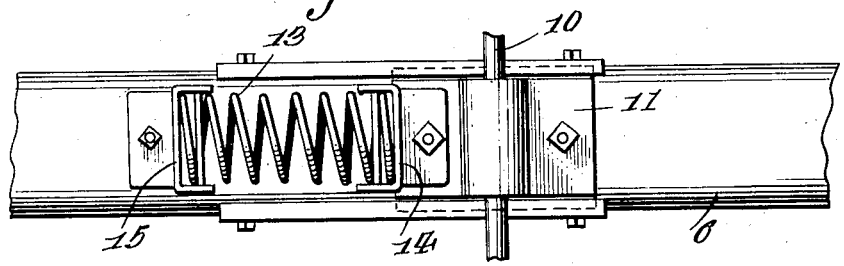
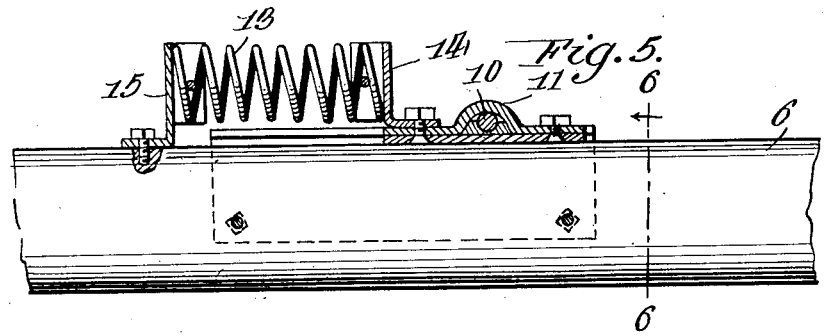
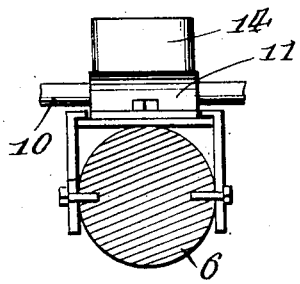
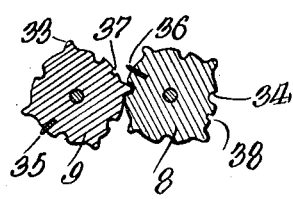
INVENTOR
Earl Becker.
WITNESSES
Guy M. Spring
Lloyd W. Patch
BY Richard Bowen.
ATTORNEY

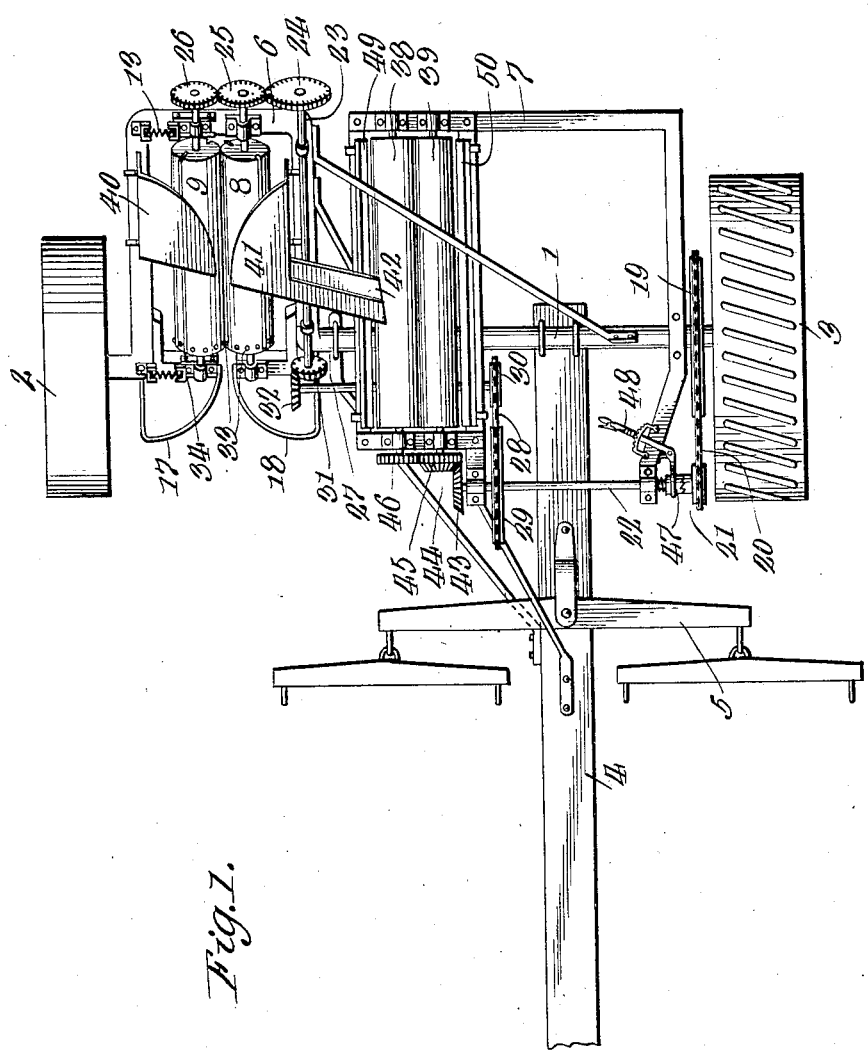

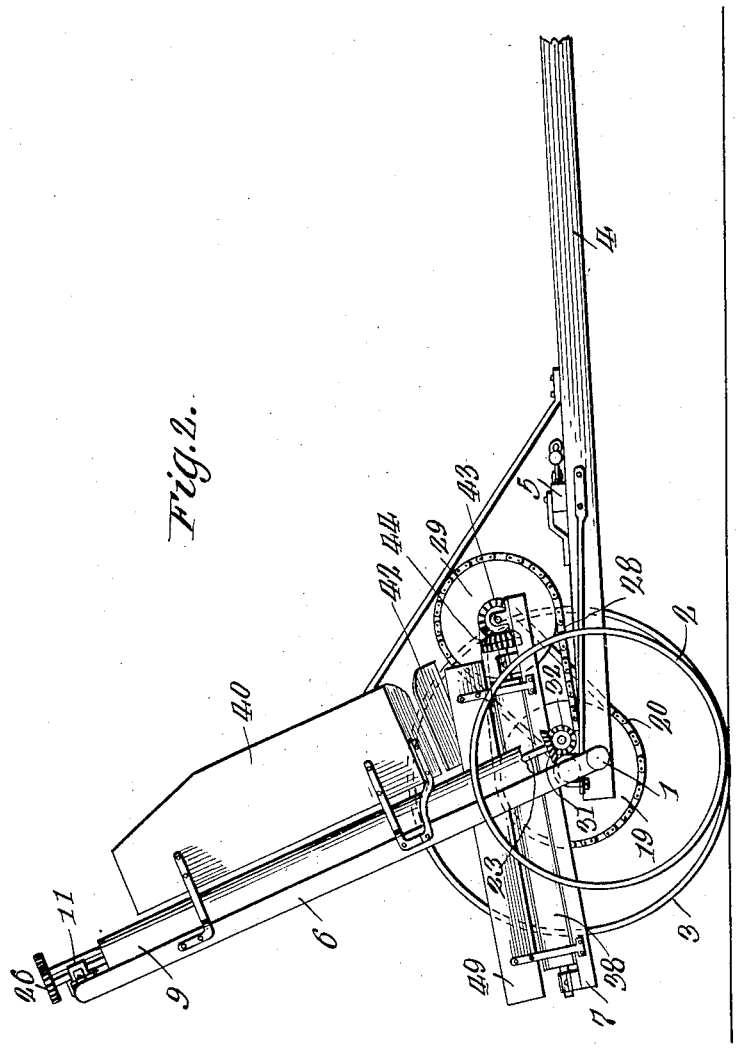

UNITED STATES PATENT OFFICE.

EARL BECKER, OF ANSONIA, CONNECTICUT.

CORN-HUSKER.

1,355,645.    Specification of Letters Patent.    Patented Oct. 12, 1920.

Application filed August 14, 1916, Serial No. 114,810. Renewed May 12, 1920. Serial No. 380,885.

*To all whom it may concern:*

Be it known that I, EARL BECKER, a citizen of the United States, residing at Ansonia, in the county of New Haven and State of Connecticut, have invented certain new and useful Improvements in Corn-Huskers, of which the following is a specification.

This invention relates to an improvement in corn huskers, and more particularly to devices of this nature such as are intended to be used in taking the ears from the stalks as they stand in the field and after husking the same, to deposit the ears again upon the field between the rows of standing stalks where the ears may be readily gathered.

An object of my invention is to provide a machine which will straighten up the standing stalks and will take the ears therefrom by snapping or breaking the same off without injuring the ears or felling the stalks, and which will in this operation of breaking the ears from the stalks consequently remove a portion of the husk.

A further object lies in providing means for directing ears of corn from the snapping rollers to the husking rollers.

With the above and other objects in view, my invention consists in certain novel constructions and combinations of parts which will be hereinafter set forth in connection with the drawings and then more particularly pointed out in claims.

In the drawings:—

Figure 1 is a top plan view of the machine,

Fig. 2 is a view in side elevation of the device,

Fig. 3 is an elevational view showing the machine as viewed from the front,

Fig. 4 is a fragmentary detail view in plan to show one of the adjustable bearings of the ear snapping rollers, Fig. 5 is a view in elevation and with parts in section of the structure shown in Fig. 4, Fig. 6 is a sectional view taken on the line 6—6 of Fig. 5, and Fig. 7 is an enlarged detail sectional view of the lower end of the rollers which come in contact with the standing stalks.

The frame structure of the machine as generally designated at 1 is carried on the supporting wheel 2 at one side and has the power or "bull" wheel 3 mounted at the opposite side to form a part of the support and carrying means upon which the machine may be moved over a field. A tongue 4 is connected with the main frame and has the double-tree 5 mounted thereon to permit the hitching of a team of draft-animals, although it will of course be understood that a motor or other mechanical power means might be arranged to propel the machine.

A frame 6 is mounted on the main frame 1 adjacent to one side thereof to extend upwardly and disposed angularly toward the rear, and a supporting frame 7 is mounted on the main frame 1 adjacent to this frame 6, the last mentioned frame being dropped somewhat at its rear end from a horizontal position. A roller 8 is mounted in the upright frame 6 and this roller is held at a fixed point to be capable of rotation on an axis extending substantially parallel with the oblique extent of the frame 6. A second roller 9 has the bearing pintles 10 thereof received through the slide bearings 11 and 12 which are mounted on the upright frame 6 adjacent to the bearings in which the roller 8 is journaled, these slide bearings 11 and 12 being arranged to be capable of movement toward and away from the bearings of the roller 8. Coiled springs 13 are mounted between the brackets 14 on the slide bearings 11 and 12 and the brackets 15 secured on the frame structure, and thus these slide bearings 11 and 12 are held pressed over so that the roller 9 bears resiliently against the roller 8 under normal conditions. The frame 6 is left open as indicated at 16, at the bottom thereof in line with the line of contact of the rollers 8 and 9, and thus as the machine may be moved across a corn field, the stalks of corn may pass through the opening 16 of the frame and through between rollers 8 and 9, due to the resilient mounting of the roller 9. It is the intention that the rollers 8 and 9 shall be constantly rotated in such directions that the stalks as gathered by the straighteners 17 and 18 which are disposed on each side of the opening 16 through the frame will be carried to these rollers and the ears of corn will be snapped or broken therefrom, and to accomplish this turning of the rollers, a driving train of mechanism is arranged from the power or "bull" wheel 3. This power transmission connection embraces the sprocket wheel 19 which is mounted to turn with the wheel 3 and which has a chain 20 passed thereover and over a sprocket wheel 21 carried on the power transmission shaft 22 which is journaled on forward part of the main frame 1. A shaft 23 is journaled on the frame 6 adjacent to and parallel with the roller 8, and this shaft 23 has a gear-wheel 24 mounted thereon which meshes with a gear-wheel 25 connected with the bearing pintle of the roller 8, this latter gear-wheel 25 being in turn meshed with a gear-wheel 26, of the same size and pitch, which is connected on the bearing pintle of the roller 9. A shaft 27 is connected on the main frame to extend substantially parallel with the shaft 22 and a sprocket chain 28 is passed over a sprocket wheel 30 on the shaft 27 to impart driving movement thereto. A bevel gear 31 is mounted on the end of the shaft 23 and a bevel gear 32 carried by the shaft 27 meshes with this gear 31, the parts being thus so arranged that as the wheel 3 is turned through the travel of the machine over a field, rotary motion will be transmitted to the rollers 8 and 9 to cause the same to turn in a direction that the corn stalks will be drawn therebetween.

As the roller 9 is resiliently held against the roller 8, the corn stalks will be permitted to pass between these rollers by spreading the same, however, the ears of corn will offer obstructions sufficiently large that the rollers will not be spread to permit passage of the same and consequently as the rotation of the rollers continues the stalks will be drawn through and the ears of corn will be snapped or broken from the stalks, and to aid in the action of taking stalks by the rollers, it is preferable that the teeth 33 be provided thereon to work in the recesses 34 to thus grip the stalks and positively fit the same between the rollers. It is preferable that the metal ribs 35 and 36 be mounted longitudinally of the rollers 8 and 9, and as these strips are here shown, they are made in the form of somewhat dull or blunt knives which work in the grooves 37 and 38 of the adjacent rollers. If for any reason the rollers should become clogged or stalks are encountered which are unusually tough and offer great resistance to the breaking of the ears of corn therefrom, these knives or strips will aid in removing the ears.

The frame 7 has the rollers 38 and 39 journaled in suitable bearings carried thereby so that the axis of rotation of these rollers is substantially parallel with a line taken from front to back of the machine, it being preferable that the rear bearings be dropped somewhat from the plane of the forward bearings so that the rear ends of these roll-bearings will be given a gradual slope downwardly from the forward ends. The shields 40 and 41 are connected with the frame 6 and are joined with the trough 42 which inclines downwardly transversely of the rollers 8 and 9 adjacent their lower ends and which conducts the ears of corn as taken from the stalks and deposits same upon the rollers 38 and 39, preferably adjacent to the forward ends of these rollers. It is the intention that the husks which may remain on the ears of corn after the same have been deposited in the trough 42 shall be removed by these rollers 38 and 39, and to accomplish the desired turning movement of the rollers, a bevel gear 43 is secured on the end of the shaft 22 and meshes with a gear 44 carried by the roller 39, a gear-wheel 45 being provided on the shaft of this roller 39 to mesh with a gear-wheel 46 of exactly the same size which is carried by the roller 38. By this arrangement of the driving mechanism, turning movement is transmitted to the rollers 38 and 39 so that they turn over and downwardly toward each other. The rollers 38 and 39 are spaced sufficiently closely together that the ears of corn cannot pass downwardly there-between, although it is preferable that some slight clearance be given between these rollers to allow passage of the husks, but under all circumstances the rollers 38 and 39 will be held sufficiently close together that the loose ends of corn husks remaining on the ears as discharged through the trough 42 will be caught between the rollers and carried there-through while the ears of corn will be held against passage between the rollers and in this way the husks will be stripped off and after passing through the rollers will be deposited upon the ground between the rows of stalks. The inclination of the rollers 38 and 39 rearwardly causes the ears of corn to be not only rolled over and turned by the constant rotation of these rollers, but also the ears will progress rearwardly over lengths of the rollers and after being thus presented to the stripping action of the rollers for some time will pass over the rear end of the rollers and fall upon the ground between the rows of standing stalks.

While it is of course essential that the rollers 8 and 9 as well as the rollers 38 and 39, all of which receive turning movement from the shaft 22 shall be constantly rotated during the operation of the machine in its travel across a field to take the ears of corn from the stalks and strip the husks from the ears, when the machine is being moved to and from the field and at other times, it may be desirable to stop rotation of these parts, and I therefore provide the clutch 47 on the shaft 22 arranged to be actuated by the clutch lever 48 so that the shaft 22 may be thrown into and out of rotating connection with the wheel 3.

In the use of the device, the machine is drawn or otherwise moved over a field in such relation that the corn stalks will be gathered and straightened by the members 17 and 18 and will pass through the opening 16 of the frame 6 where they will be caught by the teeth 33 of the rollers 8 and 9 to thus be carried through between these rollers. The springs 13 will be flexed sufficiently that the roller 9 will move from the roller 8 a sufficient distance that the stalks will pass there-between and as the ears are encountered by the rollers 8 and 9, the drawing tension on the stalks will still be continued and the ears will be held against passage between the rollers which will cause the ears to be snapped or broken from the stalks and freed to fall into the shields 40 and 41 from which they pass through the trough 42 to be deposited between the side boards 49 and 50 and upon the rollers 38 and 39. The rotation of these rollers 38 and 39 will cause the ears to be rolled and moved thereon and loose ends of the husks will be caught between the rollers and drawn and stripped from the ears while the ears will pass along throughout the lengths of the rollers 38 and 39 and will be precipitated over the rear ends thereof to be deposited on the ground between the rows of stalks. The husks which are stripped from the ears by the rollers 38 and 39 will be deposited upon the ground in advance of the dropping of the ears, and thus the ears will for the most part be held out of contact with the ground and will thus be prevented from absorbing moisture which might be otherwise taken in should the corn be permitted to lie in direct contact with the ground.

From the foregoing it will be seen that I have provided a machine which may be operated either by the use of draft-animals or through the employment of mechanical power means, and which has the parts thereof so arranged that the ears of corn are taken from the lower portions of the stalks and then from the upper portions and on up to the tops, thus distributing the working load upon the machine to better advantage, that these ears as broken from the stalks are deposited upon the means for stripping the husks there-from and that the husked corn is then discharged from the machine in a straight and even line so that it may be readily gathered.

While in the foregoing description and illustration I have described the machine in only one adaptation thereof, it will be understood that a number of variations and modifications might be resorted to in the form and arrangement of the parts without departing from the spirit and scope of my invention, and hence I do not wish to be limited to the exact disclosure but only to such points as may be set forth in the claims.

I claim:—

1. In a corn husker, a snapping mechanism comprising a pair of rollers yieldably retained in contact, each having a circumferential series of openings at one end, a circumferential series of radial teeth on one end of each roller to enter said openings of a co-acting roller during rotation of said rollers to engage the stalks therebetween, knife blades mounted in the roller between the teeth and extending radially beyond the surface of the rollers and longitudinally thereof, said rollers being provided with longitudinally extending grooves to receive said knife blades during rotation of said rollers to snap ears from said stalks.

2. The combination with a pair of snapping rollers arranged in a substantially upright position, of a pair of shields extending over said rollers and having their inner longitudinal edges spaced apart for the accommodation of stalks, and a trough arranged above and transversely of and inclined downwardly of said rollers at the lower ends of said shields for directing the ears of corn from said rollers.

In testimony whereof I affix my signature in presence of two witnesses.

EARL BECKER.

Witnesses:
 VIOLET H. MACGREGOR,
 JOHN SMITH.